G. MASTERMAN.
Grinding-Mill for Feed.
No. 206,807. Patented Aug. 6, 1878.
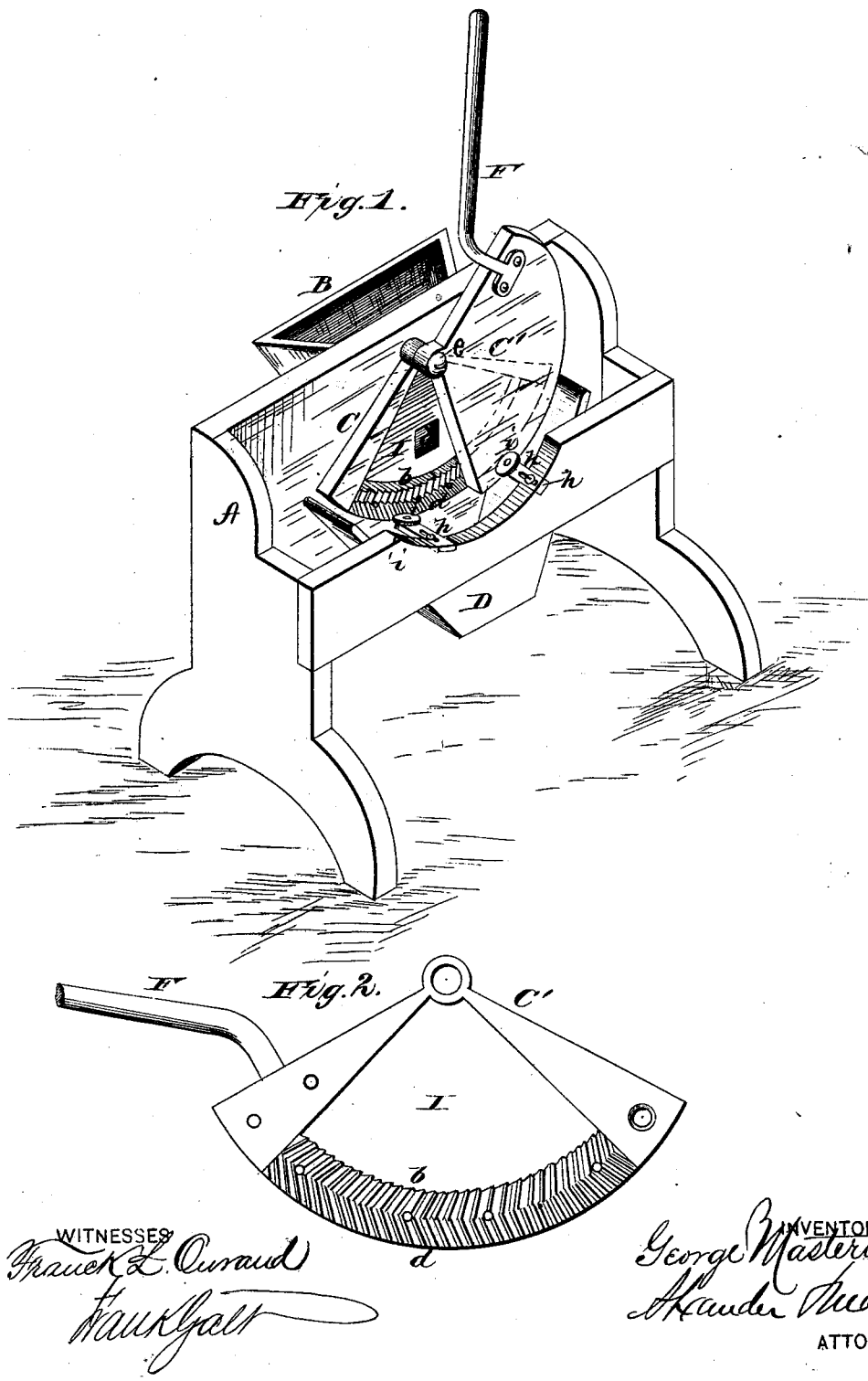

UNITED STATES PATENT OFFICE.

GEORGE MASTERMAN, OF MISHAWAKA, INDIANA, ASSIGNOR OF ONE-HALF HIS RIGHT TO MARTIN BARNHART, OF SAME PLACE.

IMPROVEMENT IN GRINDING-MILLS FOR FEED.

Specification forming part of Letters Patent No. 206,807, dated August 6, 1878; application filed March 12, 1878.

*To all whom it may concern:*

Be it known that I, GEORGE MASTERMAN, of Mishawaka, in the county of St. Joseph, and in the State of Indiana, have invented certain new and useful Improvements in Feed-Grinding Machines; and do hereby declare that the following is a full, clear, and exact description thereof, reference being had to the accompanying drawings, and to the letters of reference marked thereon, making a part of this specification.

The nature of my invention consists in the construction and arrangement of a mill for grinding feed, as will be hereinafter more fully set forth.

In order to enable others skilled in the art to which my invention appertains to make and use the same, I will now proceed to describe its construction and operation, referring to the annexed drawing, in which—

Figure 1 is a perspective view of my grinding-mill. Fig. 2 is a view of one of the grinding-plates.

A represents a frame-work of any suitable construction, with a hopper, B, on one side, where the grain is admitted, and from which it passes through an opening, $a$, in between the two grinding-plates C C', and thence, after being ground, into and through a conductor, D, to a bag or other receptacle.

The grinding-plates C and C' are made in the form of a segment of a circle, each having at the lower edge a double serrated grinding-surface, $b\ d$. The upper row, $b$, of serrations or teeth is made coarse to crack the grain, and the lower row, $d$, made finer, to grind the grain fine, the two rows being inclined in opposite directions, as shown in Fig. 2.

The plate C is made fast to the frame-work, and has the opening $a$, through which the grain enters from the hopper B.

The plate C' is pivoted at $e$ to the stationary plate C, and is provided with a lever, F, for turning the same back and forth on its pivot. This may be operated by hand or by windmill or other convenient power.

On the frame-work A are two adjustable arms, $h\ h$, each of which carries on its outer end a roller, $i$. These two rollers bear against the outer side of the plate C', near the lower edge, to hold the same against the stationary plate C, and by adjusting said arms $h\ h$ the degree of fineness of the ground material is easily regulated.

It will be noticed that above the grinding-surfaces the plates C C' form a chamber, I, into which the grain is first admitted, and from thence it enters between the surfaces $b\ b$ of the two plates.

Having thus fully described my invention, what I claim as new, and desire to secure by Letters Patent, is—

The two segmental plates C and C', one being stationary and the other pivoted thereto, and capable of being partially rotated, the lower inner faces of both plates being each provided with two sets of corrugations at opposite inclinations, and forming a chamber, I, between the two plates, above said corrugations, and the plates connected to a frame having a side hopper, with an aperture, $a$, to convey the grain to the chamber I, all substantially as and for the purposes herein set forth.

In testimony that I claim the foregoing I have hereunto set my hand this 12th day of February, 1878.

GEORGE MASTERMAN.

Witnesses:
 EGBERT L. FINNEY,
 MARTIN BARNHART.